(12) United States Patent
Amini et al.

(10) Patent No.: US 7,545,978 B2
(45) Date of Patent: Jun. 9, 2009

(54) METHODS AND APPARATUS FOR FILTERING VIDEO PACKETS FOR LARGE-SCALE VIDEO STREAM MONITORING

(75) Inventors: Lisa Dronette Amini, Yorktown Heights, NY (US); Ching-Yung Lin, Forest Hills, NY (US); Olivier Verscheure, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 11/173,124

(22) Filed: Jul. 1, 2005

(65) Prior Publication Data

US 2007/0286489 A1    Dec. 13, 2007

(51) Int. Cl.
  *G06K 9/00* (2006.01)
(52) U.S. Cl. .................. 382/170; 382/195; 348/700; 725/52; 725/53
(58) Field of Classification Search ................ 382/170, 382/195; 348/700; 725/52, 53
  See application file for complete search history.

(56) References Cited

U.S. PATENT DOCUMENTS

| | | | | |
|---|---|---|---|---|
| 5,956,026 | A | * | 9/1999 | Ratakonda .................. 715/723 |
| 2002/0054083 | A1 | * | 5/2002 | Boreczky et al. ............ 345/738 |
| 2003/0021342 | A1 | * | 1/2003 | Nesvadba et al. ........... 348/700 |
| 2006/0048191 | A1 | * | 3/2006 | Xiong .......................... 725/53 |

OTHER PUBLICATIONS

S. Madden et al., "The Design of an Acquisitional Query Processor for Sensor Networks," SIGMOD, San Diego, CA, pp. 1-14, Jun. 2003.
A. Amir et al., "IBM Research TRECVID-2003 Video Retrieval System," NIST TREC-2003, 18 pages, Nov. 2003.
C-Y. Lin et al., "VideoAL: A Novel End-to-End MPEG-7 Video Automatic Labeling System," IEEE ICIP 2003, Barcelona, 4 pages, Sep. 2003.
B. Schölkopf et al., "New Support Vector Algorithms," NC2-TR-1998-031, pp. 1-26, Nov. 1998.
C-Y. Lin et al., "Video Collaborative Annotation Forum: Establishing Ground-Truth Labels on Large Multimedia Datasets," NIST TRECVID Workshop, MD, 19 pages, Nov. 2003.

* cited by examiner

*Primary Examiner*—Vikkram Bali
*Assistant Examiner*—Daniel Zeilberger
(74) *Attorney, Agent, or Firm*—Kenneth R. Corsello; Ryan, Mason & Lewis, LLP

(57) ABSTRACT

A method of filtering video packets for video stream monitoring is provided. A video packet of a video stream is received. One or more features are extracted from a specified frame of the video packet via one or more histograms and frequency domain coefficients of the specified frame. One or more concept detectors are implemented on the one or more features creating one or more confidence values. The confidence values are transmitted to a display module for filtering of video packets.

1 Claim, 4 Drawing Sheets

METHODS AND APPARATUS FOR FILTERING VIDEO PACKETS FOR LARGE-SCALE VIDEO STREAM MONITORING

STATEMENT OF GOVERNMENT RIGHTS

This invention was made with Government support under Contract No.: TIA H98230-04-3-0001 awarded by U.S. Dept. of Defense. The Government has certain rights in this invention.

FIELD OF THE INVENTION

The present invention relates generally to large-scale video stream monitoring systems and, more particularly, to techniques for filtering video packets through feature extraction for large-scale video stream monitoring.

BACKGROUND OF THE INVENTION

The monitoring of information from large-scale video streams presents several challenging problems. For example, an ideal monitoring system provides the ability to process a large amount of data, while also providing an understanding of the semantic content of the data in real-time. After processing and understanding the data, the monitoring system uses these results to filter the information.

Examples of situations in which it is desirable to provide an information monitoring system that achieves such goals may include, for example, the monitoring of foreign military or political activities through hundreds of live broadcasting video channels; the monitoring of activities and context of hundreds of video cameras mounted on cars or soldiers; and the monitoring of Internet traffic to determine whether movies are being illegally distributed. The semantic content that is required to be understood in these examples may include, for example, the mentioning of political leader activities on foreign broadcasting news, the type of scene a soldier is viewing, and the type of video being played through an Internet source.

Traditional indexing and semantic content detection techniques developed for databases are not easily extendible to the dynamic nature of video streams. However, recently, real-time stream information classification has received greater attention on other modalities, such as, for example, email activities, chat room monitoring, and voice over Internet protocol (VoIP) monitoring, due to the inherent challenges regarding classification and information routing speed.

Traditional approaches to large-scale video stream monitoring have relied on storage-and-process techniques, which have associated limitations. For example, once the data amount, CPU power or CPU memory reaches a certain threshold, these systems may break down entirely. Therefore, it is desirable to have an improved system filter transmission video packets based on the semantic content at a faster speed under various resource constraints.

A semantic routing tree has been used to route signal-level information on a resource-constrained sensor network, see, for example, S. Madden et al., "The Design of an Acquisitional Query Processor for Sensor Networks," SIGMOD, San Diego, Calif., June 2003. Routing is based on the signal properties and predefined decision trees. However, multimedia streaming data has content that is more difficult to detect and filter. Even in the raw video data domain without any resource constraint, video semantics detection remains an open issue, see, for example, A. Amir, et al., "IBM Research TRECVID-2003 Video Retrieval System," NIST TREC-2003, November 2003.

In large-scale video streams scenarios, the targeted video content may stream at speeds in a range of approximately tens of gigabytes of multimedia per second. An ideal system is able to conduct semantic content detection of the video streams in real-time. Unfortunately, existing systems are unable to provide the streaming video bandwidth necessary for routing multimedia data to the classifiers, and are also unable to achieve real-time semantic content detection.

Therefore, a novel semantic filtering system that can be applied to large-scale content monitoring is desired that reduces the amount of transmission loads through filtering of video content packets based on semantic detection.

SUMMARY OF THE INVENTION

The present invention provides techniques for filtering video stream packets for video stream monitoring. More specifically, the embodiments of the present invention provide techniques for extracting features from video packets of a video stream for filtering purposes. Thus a novel semantic filtering system is provided that can be applied to large-scale video stream monitoring. The semantic filtering system reduces the amount of transmission loads through filtering video content packets based on semantic detection. A set of novel video features are utilized that result in better performance.

For example, in one aspect of the present invention, a method of filtering video packets for video stream monitoring is provided. A video packet of a video stream is received. One or more features are extracted from a specified frame of the video packet via one or more histograms and frequency domain coefficients of the specified frame. One or more concept detectors are implemented on the one or more features creating one or more confidence values. The confidence values are transmitted to a display module for filtering of video packets.

In an additional embodiment of the present invention, a method of extracting features from video packets for filtering purposes is provided. A video packet is parsed to attain a specified frame. A histogram is calculated for each of one or more slices of the specified frame using frequency domain coefficients of the specified frame. A feature vector of the specified frame is created based on the one or more calculated histograms.

The histogram may be calculated by determining frequency domain coefficients of the specified frame. The specified frame is partitioned into one or more slices and selected frequency domain coefficients are truncated in each of the one or more slices of the specified frame. A histogram of the frequency domain coefficients for each of the one or more slices of the specified frame is calculated.

A semantic filtering framework is provided for large-scale monitoring of video streams, which is capable of simultaneously monitoring the content of multiple video streams being transmitted over the Internet (or a proprietary network), handling tens of gigabytes of multimedia data per second. A mechanism alters the accuracy of classification with the complexity of execution; thus avoiding system failure during periods of overload. A set of novel video features is provided that perform better than previous semantic classifiers. This system is also capable of classifying over a hundred concepts.

These and other objects, features and advantages of the present invention will become apparent from the following detailed description of illustrative embodiments thereof, which is to be read in connection with the accompanying drawings.

DETAILED DESCRIPTION IF PREFERRED EMBODIMENTS

As will be illustrated in detail below, the present invention introduces techniques for extracting features from a specified frame of a video packet for filtering of video packets in a video stream monitoring system.

Figure 1:
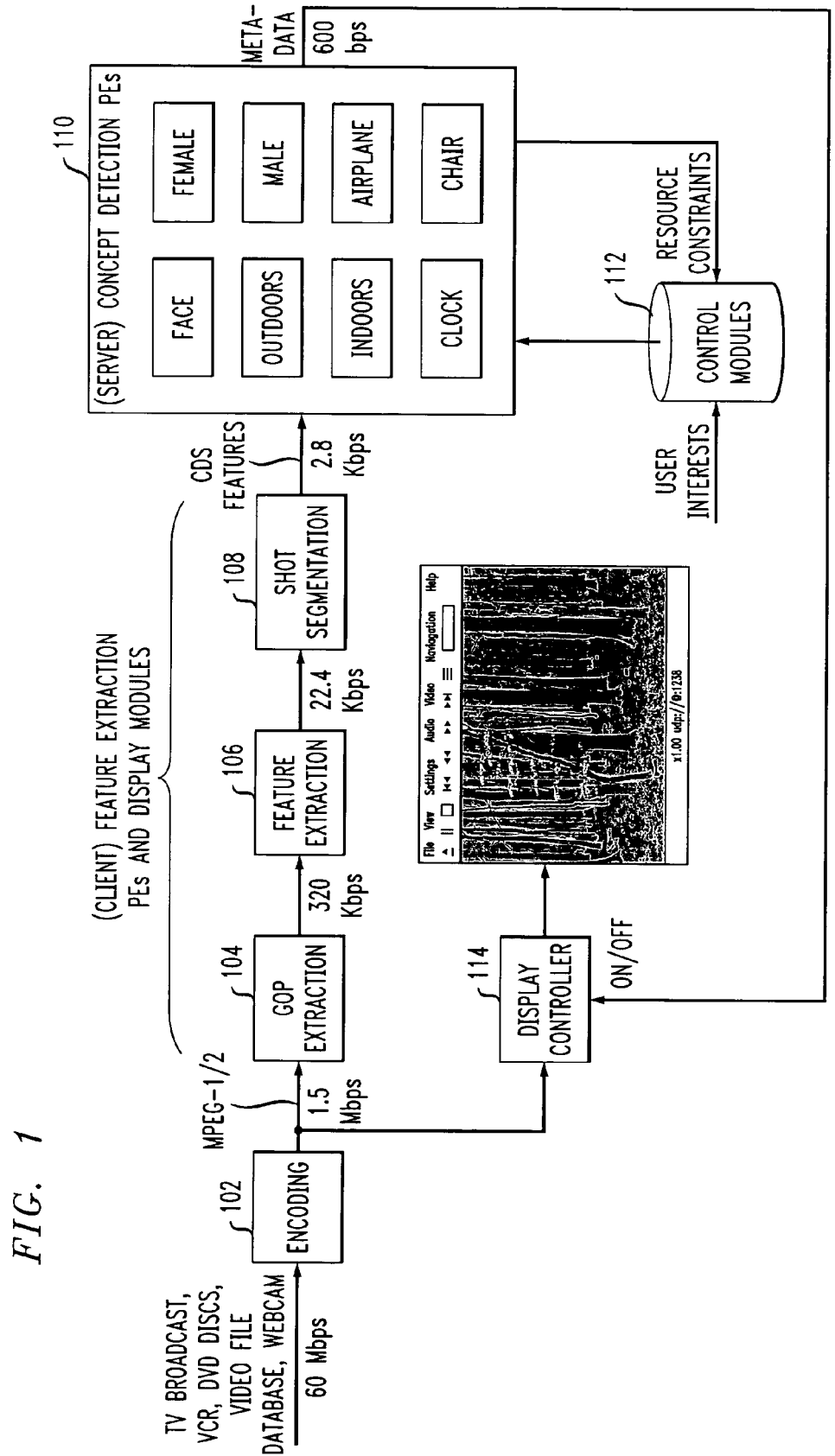
FIG. 1 is a flow diagram illustrating a streaming video semantic filtering methodology, according to an embodiment of the present invention.

Referring initially to FIG. 1, a flow diagram illustrates a streaming video semantic filtering methodology, according to an embodiment of the present invention. A video stream is fed into the system, preferably at a rate of approximately 60 megabytes per second (mbps). This system may handle TV broadcasts, VCR cassettes, DVDs, video file databases, and webcam inputs. The video stream undergoes encoding in block 102 for transformation to MPEG-1 or MPEG-2 format, preferably at approximately 1.5 mbps. The MPEG is fed into feature extraction processing elements (PEs) as well as display controller 114. It is not necessary for the feature extraction PEs and display modules to reside on the same machine.

In the feature extraction PEs, the MPEG is first fed into a GOP extraction block 104 where groups of pictures (GOPs) are extracted. These GOPs are transmitted, preferably, for example, at approximately 320 kilobytes per second (kbps), to a feature extraction block 106 where features are extracted from the GOPs. These features are preferably transmitted at approximately 22.4 kbps to a shot segmentation block 108, which results in compressed-domain slice (CDS) features.

The feature extraction PEs extract and send the CDS features to a server machine 110, which may implement, for example, approximately one hundred concept detectors. The CDS features are preferably sent at a rate of approximately 2.8 kbps. These concept detectors may include elements such as face, female, male, outdoors, indoors, airplane, chair, etc. In this embodiment of the present invention, a control module 112 is used to match user interests with a confidence output of semantic model vectors. Then, confidence values resulting from this matching are stored as metadata and sent back to display module 114 to filter the content. However, many different techniques may be utilized for concept detection using semantic classifiers.

A PE is an independent executable thread which has specific ports for input and output streams. Thus, PEs can be distributed in different machines. In this embodiment of the present invention, GOP extraction block 104, feature extraction block 106 and shot segmentation block 108 are included on the client machine, which may reside in a smart camera or an edge router in the network. There can be tens of such distributed (and parallel) clients sending feature packets to the distributed server classifiers. For each shot, a CDS feature packet, which is less than 1.4K bits, is sent to a server router which multicasts these feature packets to the classifier PEs. Because the feature rate is less than 2.8 kbps, the transmission load is only 56 kbps if the server PEs needs to classify 200 video streams simultaneously. Even if all classifier PEs are placed in one machine, a regular Pentium 2.4 GHz with a 1 GB RAM server can deal with 40 concurrent incoming streams in real-time with one hundred concept detectors.

A new CDS feature set is proposed that results in better accuracy of concept classifiers with a shorter extraction time, compared to, for example, A. Amir, et al., and C.-Y. Lin et al., "VideoAL: End-to-End System MPEG-7 Video Automatic Labeling System," ICIP 2003, Barcelona, September 2003. The reduction in computational load is significant: for a typical 320×240 MPEG-1 video stream, a decoder needs about 2 million multiplications to decode an I-frame. Also, the algorithms in A. Amir et al. and C.-Y. Lin et al. require complex region/object segmentation and compute 12 sets of features. Feature selection of previous systems was about 3 times slower than real-time, which provided the bottleneck for real-time large-scale implementations.

Figure 2:
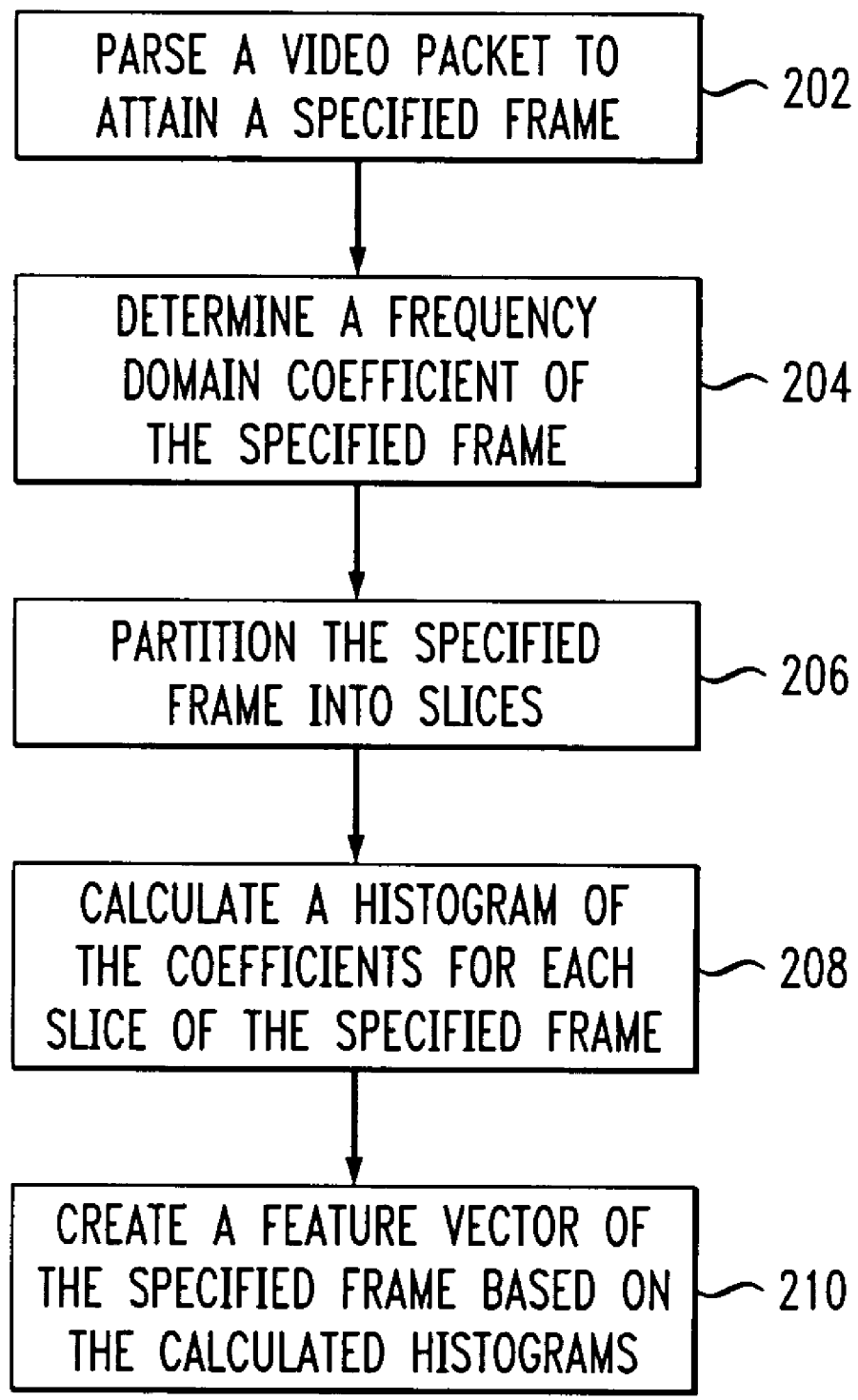
FIG. 2 is a flow diagram illustrating a feature extraction methodology, according to an embodiment of the present invention.

Referring now to FIG. 2, a flow diagram illustrates a feature extraction methodology, according to an embodiment of the present invention. This may be considered a detailed description of the steps taken in the feature extraction PEs as shown above with regard to FIG. 1. The methodology begins in block 202, where a video packet is parsed to attain a specified frame. The video packet may be, for example, an MPEG-1 or MPEG-2 packet in this embodiment of the present invention. The specified frame is preferably the beginning of an I-frame or the closest I-frame of a pre-specified shot key frame. An I-frame is a full frame that does not need information from the frame before or the frame after in order to play properly. Thus, an I-frame is a key frame or reference video frame that acts as a point of comparison to p-frames and b-frames and is not rebuilt from another frame.

In block 204, a frequency domain coefficient of the specified frame is determined. The frequency domain coefficient is preferably determined by using variable length code (VLC) maps to map VLCs of the specified frame to discrete cosine transform (DCT) coefficients. In block 206, the specified frame is partitioned into two or more slices. Preferably, the frame is partitioned into three slices. In block 208, a histogram of the DCT coefficients is calculated for each of the slices of the specified frame.

Finally, in block 210, a feature vector of the specified frame is created based on the calculated histograms, terminating the methodology. Preferably the histograms from three DCT coefficients on each color plane are used. DCT coefficients are divided into a DC coefficient, which is a coefficient with zero frequency in both directions, and AC coefficients, which are the remaining coefficients with non-zero frequencies. In an embodiment of the present invention, the three DCT coefficients include the DC coefficient and two lowest frequency AC coefficients on each color plane, Y, Cb and Cr, forming a 576-dimensional feature vector.

In the above methodology, it is evident that no multiplication operation is required to produce these feature vectors. Only addition is required for calculating the histogram. As in A. Amir et al., a support vector machine (SVM) is used to train models and classification. Fusion of different sets of features (color, edge, motion, and texture) is an open issue, which is also application-dependent. Complicated (feature or classifier) fusion does not necessary lead to better results. These CDS features may be considered an early-fusion method for classification.

It should be determined whether specific types of classifiers can perform relatively well under all kinds of resource constraints, because many classification systems may not be able to do so. A training set $\{(x_1, y_1)\}, (x_2, y_2), \ldots, (x_N, y_N)$ is provided, where $x_i \in X$ denotes the input patterns, and $y_i \in \{-1, 1\}$ denotes the binary labels. The goal for a supervised classifier is to find a function $f(x)$ that has, at most, $\epsilon$ deviation from $y_i$ for all the training data, and is as flat as possible. In the training stage, if using SVM, the models can be built based on different kernel functions and cost ratios of error margin on positive and negative examples. The SVM classifier is a function of:

$$f(x) = \sum_{i=1}^{S} a_i \cdot k(x, x_i) + b \quad (1)$$

$$k(x, x_i) = e^{-\frac{|x-x_i|^2}{r}} \quad (2)$$

where S is the number of support vectors, $k(.,.)$ is a kernel function, e.g., the Gaussian kernel, $a_i$ is the weighting of SVs, and b is a constant threshold value. The goal of SVM is to find a hyperplane which best separates training examples with a minimum cost. The kernel function can be considered as a distance function between unknown vectors and SVs.

In the distributed system with independent PEs, PEs are required for switching among various operating points with little overhead. One solution is to generate embedded classifiers. For different operating points, the lower complexity classifiers are subsets of high complexity classifiers without a few parameters' updates. For instance, from equations (1) and (2), it is known that the complexity of SVM-based classifiers depends on the kernel, the feature dimensions and the number of support vectors. Regardless of the storage and I/O access requirements, if the complexity c as the number of operations (multiplications, additions) required for classification is considered, then the resource needed for such computation is:

$$c \propto S \cdot D \quad (3)$$

where D is the dimensionality of the feature vector, and S is the number of support vectors.

The PE achieves various operating points of the C-A curve by controlling the number of features to extract and the number of support vectors by setting unneeded SVs to zero. In the embodiments of the present invention, models are assumed to have been only trained once without resource constraint consideration or models may be provided by third-party provider. Thus, the system can only generate these C-A curves based on existing classifiers. Four methods are used to determine these curves: selecting n SVs with n max $a_i$, $|a_i|$, random selection, or clustering on SVs. The first three methods are embedded classifiers, while the fourth method is not. Operation points are determined by off-line training using a validation set.

If training samples are available, the system may use other methods with pre-determined thresholds on SVs and error margin, v-SVM, see, for example, B. Scholkopf et al., "New Support Vector Algorithms," NC2-TR-1998-031, November 1998. However, this causes additional system I/O load while switching between different operating points.

A 62-hour development set may be used, which has been manually annotated with 133 audio and video concepts, see, for example, C.-Y. Lin et al., B. L. Tseng et al., "Video Collaborative Annotation Forum: Establishing Ground-Truth Labels on Large Multimedia Datasets," NIST TRECVID Workshop, MD, November 2003. This set was divided into four parts: CR (38 hrs), CV (6 hr), CF1 (6 hr) and CF2 (12 hr). As in A. Amir, et al., visual models are trained using the CR set, and the modeling parameters are selected using the CV set. The models are then tested on the unseen CF1 and CF2 sets. Note that the manual annotation of CF1 and CF2 sets is only used for measuring the system performance. The Average Precision (AP) value is used, which is the integral area under the precision-recall curve to measure the accuracy. AP is usually used by NIST to provide a single-value metric of the P-R curve. Mean Average Precision (MAP) is used by averaging the AP values of a system across all testing concepts, see, for example, A. Amir, et al., to compare the performance of systems.

The 576-dimensional CDS feature vectors of the 28,055 keyframes in the CR set are used for training. Each visual concept is trained independently. Positive examples of a training set are selected, if a shot is annotated with this label or any children label in the hierarchical semantic tree, see, for example, C.-Y. Lin et al. All other shots are considered as negative. The negative examples are sub-sampled by a constraint of maximum negative-positive ratio of 5:1. For each concept, 9 models of a hybrid of 3 different kernels (linear, polynomial, and Gaussian) and 3 cost functions (1, 10, and 100) are trained.

Figure 3:
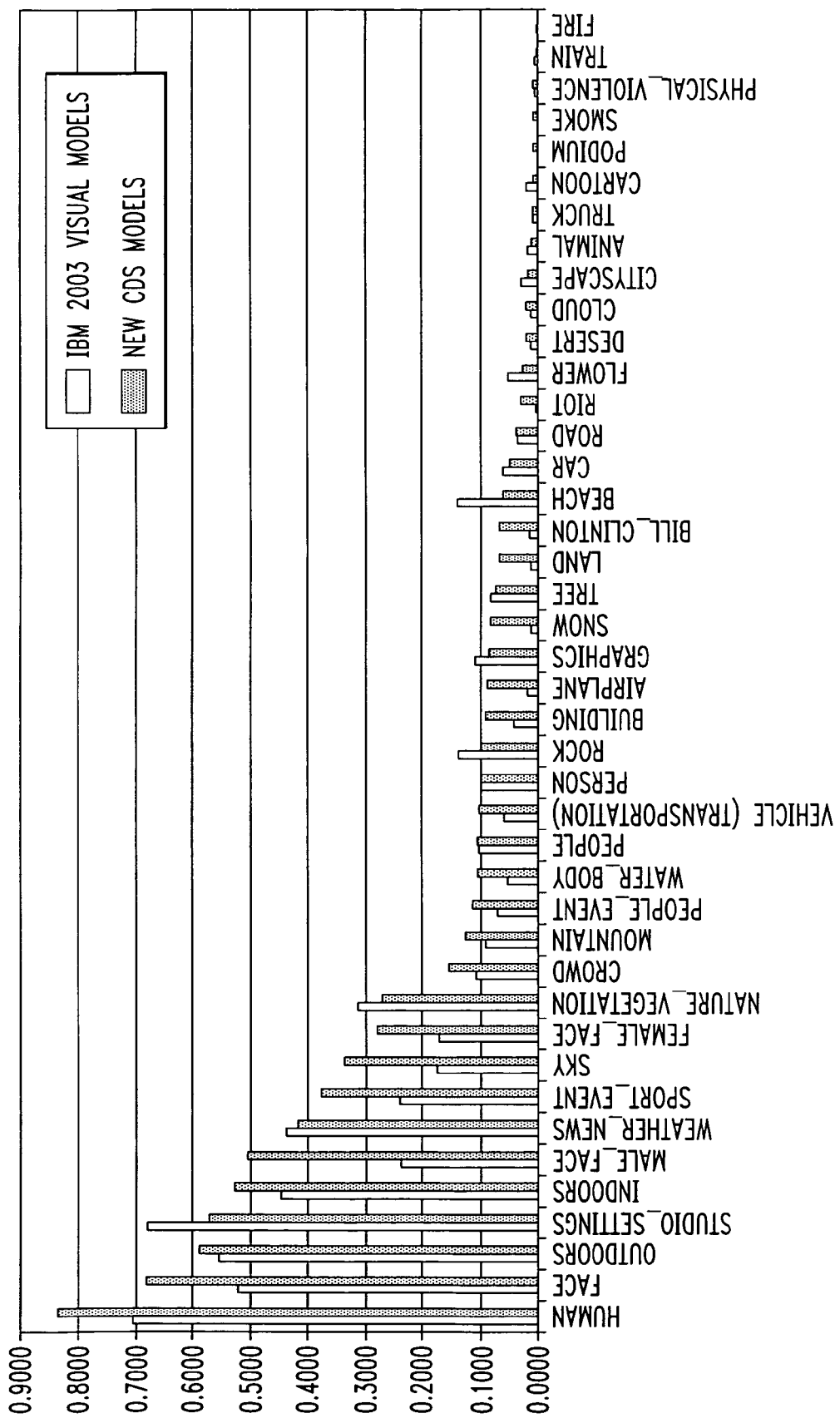
FIG. 3 is a graph illustrating a performance comparison of the embodiments of the present invention and IBM visual concept models.

A performance comparison between the new models of the present invention and the IBM 2003 visual concept models is shown in FIG. 3. The IBM visual concept models were fused with the speech-based detectors to form the IBM multi-modality detectors that performed best in the TRECVID 2003, see, for example, A. Amir, et al. In 2003, 42 visual models were internally extensively evaluated using the CF2 set, with a MAP of 0.1404. The MAP of the corresponding 42 models based on the new CDS features is 0.1705, which is 21.48% better. If the 13 visual detectors specified by NIST were only considered, the gain of MAP values is 23.6% (0.2091 vs. 0.1692).

Figure 4:
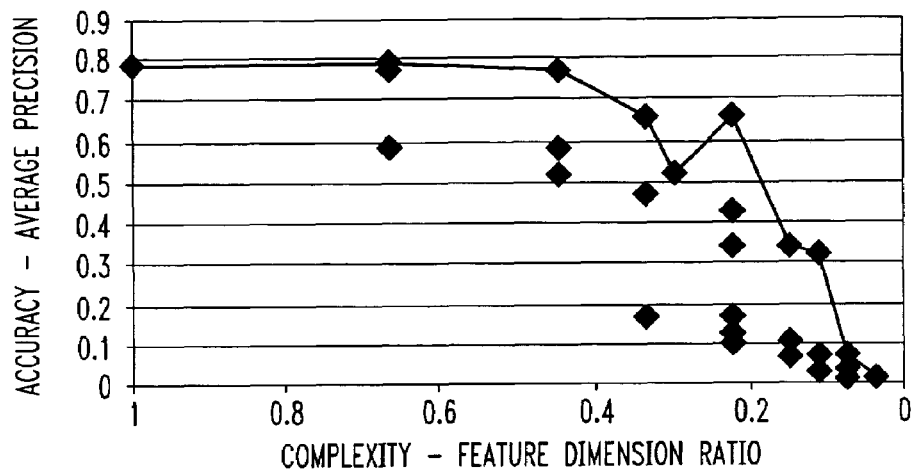
FIG. 4 is a graph illustrating a complexity-accuracy curve with reduced feature vector dimensionality, according to an embodiment of the present invention.
Figure 5:
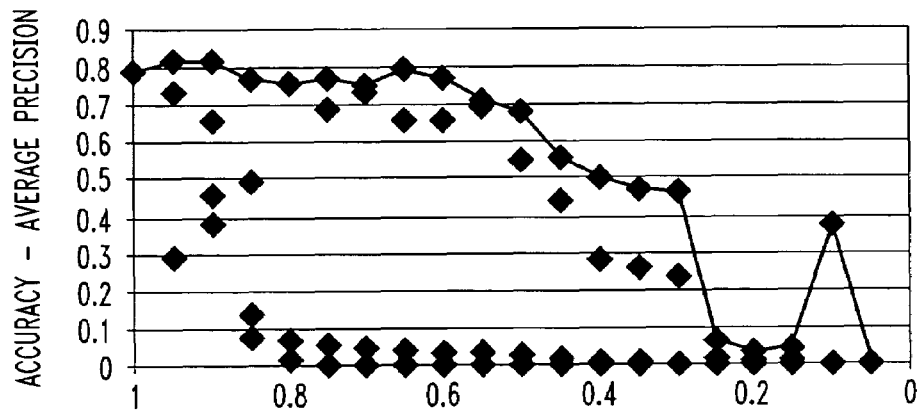
FIG. 5 is a graph illustrating a complexity-accuracy curve with fewer support vectors (SVs), according to an embodiment of the present invention.

FIGS. 4 and 5 show the complexity-accuracy curves of some preliminary experiments for an embodiment of the present invention. In both cases, classifiers are all embedded, thus, only simple coefficient masking is used in the run-time system operations. In FIG. 4, it is shown that if the dimensionality of feature vectors is reduced, the AP of a classifier varies. For example, if the system operates at 22% of the original resources (in terms of time and storage), then it may achieve an AP of 0.658, which is 83% of the best accuracy. For each complexity value, there may be several accuracy points available due to different feature dimension reduction techniques. In the above case, the operating point was selected with the feature values from all 3 slices, 1 set of color histograms (i.e., gray-level) and 2 sets of textures (i.e., 1 DC histogram and 1 AC histogram).

In FIG. 5 an example of the accuracy-complexity curve based on the reduction of number of SVs is shown. This model has 440 SVs, and with 50% of the SVs, the classifier achieves 86.6% of the original accuracy. Similarly, there could be several operating points for each reduction ratio.

Figure 6:
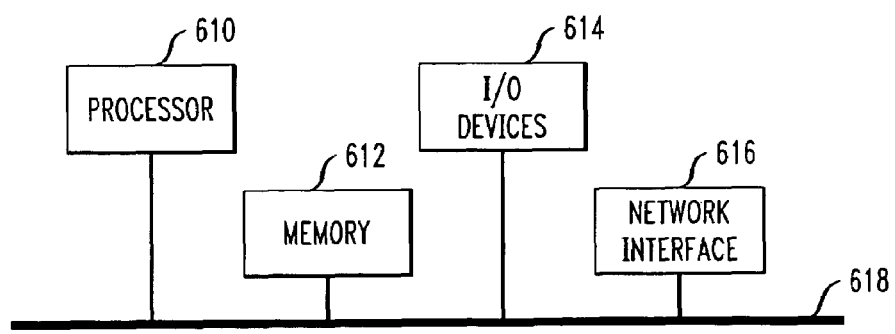
FIG. 6 is a block diagram illustrating an exemplary hardware implementation of a computing system in accordance with which one or more components/methodologies may be implemented, according to an embodiment of the present invention.

Referring now to FIG. 6, a block diagram illustrates an exemplary hardware implementation of a computing system in accordance with which one or more components/methodologies of the invention (e.g., components/methodologies described in the context of FIGS. 1-3) may be implemented, according to an embodiment of the present invention.

As shown, the computer system may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

A novel semantic filtering system for large-scale video monitoring and reducing the amount of transmission loads is provided by the embodiments of the present invention. A set of novel visual features, which results in significant gains in both speed and accuracy, has also been provided.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of filtering video packets for video stream monitoring, comprising executing the following steps using a computer system:

receiving a video packet of a video stream;

extracting one or more features from a specified frame of the video packet via one or more histograms and frequency domain coefficients of the specified frame, wherein the one or more features comprise compressed-domain slice features, further wherein the step of extracting one or more features further comprises the steps of parsing the video packet to attain a specified frame, calculating a histogram for each of one or more slices of the specified frame using frequency domain coefficients of the specified frame, and creating a feature vector of the specified frame based on the one or more calculated histograms, wherein the step of calculating a histogram further comprises the steps of determining frequency domain coefficients of the specified frame, partitioning the specified frame into one or more slices, and calculating a histogram of the frequency domain coefficients for each of the one or more slices of the specified frame, and truncating selected frequency domain coefficients in each of the one or more slices of the specified frame, the step of calculating a histogram of the frequency domain coefficients further comprising the step of using a DC coefficient and one or more AC coefficients of discrete cosine transformation coefficients on one or more color planes, the one or more AC coefficients comprising two lowest frequency AC coefficients, further wherein the step of determining frequency domain coefficients comprises the step of mapping a data compression coding scheme to frequency domain coefficients of the specified frame, the data compression coding scheme comprising variable length codes;

implementing a plurality of concept detectors on the one or more features creating one or more confidence values by multicasting each of the one or more features to the plurality of concept detectors, wherein the step of implementing the plurality of concept detectors further comprises the step of matching user interests with a confidence output of semantic model vectors; and transmitting the one or more confidence values to a display module for filtering of video packets, wherein the step of transmitting the one or more confidence values further comprises storing the one or more confidence values as metadata, and transmitting the metadata to the display module for filtering of video packets.

* * * * *